Dec. 10, 1957 J. R. LIKENS 2,815,853
PRODUCE LOADING APPARATUS
Filed Oct. 13, 1952 6 Sheets-Sheet 1

INVENTOR.
JAMES R. LIKENS
BY *Francis A. Cummer*
ATTORNEY

Dec. 10, 1957 J. R. LIKENS 2,815,853
PRODUCE LOADING APPARATUS
Filed Oct. 13, 1952 6 Sheets-Sheet 2

INVENTOR.
JAMES R. LIKENS
BY
ATTORNEY.

Dec. 10, 1957  J. R. LIKENS  2,815,853
PRODUCE LOADING APPARATUS
Filed Oct. 13, 1952  6 Sheets-Sheet 3

INVENTOR.
JAMES R. LIKENS
BY
ATTORNEY.

Dec. 10, 1957          J. R. LIKENS          2,815,853
PRODUCE LOADING APPARATUS
Filed Oct. 13, 1952                          6 Sheets-Sheet 4

INVENTOR.
JAMES R. LIKENS
BY
           ATTORNEY.

Dec. 10, 1957  J. R. LIKENS  2,815,853
PRODUCE LOADING APPARATUS
Filed Oct. 13, 1952  6 Sheets—Sheet 5

INVENTOR.
JAMES R. LIKENS
BY
ATTORNEY.

Dec. 10, 1957 J. R. LIKENS 2,815,853
PRODUCE LOADING APPARATUS
Filed Oct. 13, 1952 6 Sheets-Sheet 6

INVENTOR.
JAMES R. LIKENS
BY Francis D. Ammen
ATTORNEY.

United States Patent Office 2,815,853
Patented Dec. 10, 1957

2,815,853

PRODUCE LOADING APPARATUS

James Robert Likens, Los Angeles, Calif.

Application October 13, 1952, Serial No. 314,515

5 Claims. (Cl. 198—233)

This invention relates to a produce loader, that is to say, an apparatus that can be set up for slow movement across a field in which the produce lies, and is picked by field workers and placed in the apparatus for delivery into a carrier or truck.

One of the objects of this invention is to provide an apparatus for this purpose that is capable of being advanced by stages, or otherwise across a field; and to provide such apparatus with conveying means upon which field workers deposit the produce; and to provide means whereby the conveying apparatus can deliver the produce over the side of a carrier or carriers, as truck or trucks. They would also be advanced with the apparatus so as to enable some one truck in the fleet of trucks used to be in a position to receive the produce delivered to it at the delivery end of the conveying means.

Another object of the invention is to provide a conveying means with features of construction that would enable it to function to advance and deliver the produce to the truck in a manner of handling that would minimize injury or marring of the produce handled by the apparatus.

Another object of the invention which particularly concerns the conveying means employed is to provide the apparatus with means for supporting and advancing a relatively long conveyor across the field so that the conveyor extends laterally with respect to its direction of advance across the field. In other words, in the operation of the apparatus, as the conveying means, or long conveyor advances laterally across the field, the field workers or pickers place the picked produce on this conveyor. The conveyor then functions to deliver the produce promptly into the carrier or truck that is located at its delivery end. The co-operation of the pickers and the apparatus results in a great saving of time, as the pickers do not have to carry the produce over to a truck as is now the practice, and then return to pick additional produce. All the pickers have to do is to keep pace with the advancing apparatus while they pick the produce that it is passing. In this way, the pickers and the apparatus may be said to "cut a wide swath" across the field of produce, each swath gathering so much produce that the "output," or picking rate of each picker measured in picked produce is enormously increased. The efficiency is so high that a great saving in labor cost results.

Another object of the invention is to provide a portable frame or vehicle with features of construction that admirably adapt it for supporting a relatively long conveyor without over-balancing the vehicle. To this end, one of the novel features of the invention is the disposing of the long conveying means or conveyor in such a way that it passes at its delivery end past the chassis or frame of the vehicle so as to deliver the produce on the opposite of the vehicle from the points where the produce was loaded onto the conveyor. While this is not an essential element of the invention, it facilitates the use of a long conveyor which is long enough to provide working space for a relatively great number of pickers; and of course, the greater number of pickers that can be used, the greater is the economy resulting from the use of the apparatus.

Another object of the invention is to construct the conveying means or conveyor so that it can be folded against the side of the frame or body of the apparatus, that is to say, so that a conveyor of considerable length can be stowed away in that manner so that it will not exceed permissible widths when driving the vehicle along an ordinary roadway to the fields in which the apparatus is operating.

Another object of the invention is to provide ground wheels for the apparatus frame, mounted and controlled in such a way as to enable them to support the frame of the apparatus most advantageously for enabling it to co-operate with the other mechanism of the apparatus in performing its functions; particularly to provide features of construction for the vehicle frame and its ground wheels, and their mountings that will enable the frame of the apparatus to have a high degree of dirigibility. This facilitates the use of a long frame for the vehicle that can also be organized to advance laterally across the field when in operation, but which can be advanced longitudinally along a roadway when going to and from the field.

Another object of the invention is to provide the delivery end of the conveying means with accessory features of construction that will facilitate a controlled equable distribution of the produce over the floor of a carrier or truck that is receiving it.

While the present apparatus is intended for use in loading melons, tomatoes or similar produce, obviously it may be used advantageously to facilitate the collecting and loading of any such articles to be gathered from a field.

Further objects of this invention will be apparent from a careful reading of the following specification and study of the accompanying drawing.

The invention consists in the novel parts and combinations of parts to be described hereinafter, all of which contribute to produce an efficient produce loader.

A preferred embodiment of the invention is described in the following specification, while the broad scope of the invention is pointed out in the appended claims.

In the drawing:

Figure 5 is an end elevation of the apparatus, certain parts being broken away or shown in section. This view particularly illustrates the general arrangement of elements concerned with the drive to the ground wheels and the imparting of the steering movement to the wheels which movement has its origin at the steering wheel at either end of the frame of the apparatus.

Figure 6 is a vertical section in the plane of the line

6—6 of Figure 5, but upon a slightly larger scale than the scale of Figure 5, and particularly illustrating the wheel mounting for the ground wheels on the wheel posts that extend down from the frame of the apparatus to carry the ground wheels; and this view also illustrates the means for mounting the wheel housings on the wheel posts and shows details of the drive to the ground wheels and the means for imparting the steering movement to them.

Referring now particularly to Figures 1, 7, 10, and 14 in practicing the invention I employ a frame 1, preferably an elongated frame, which is supported on ground wheels 2, which in the present instance, are four in number.

The frame 1 is preferably supported at a relatively high level so as to give necessary clearance for conveyor means 3 that is underslung from the frame on spaced hangers 4 sufficient in number to support the conveyor means 3 that comprises a main division or extension 3a the right end of which is provided with means for raising the produce to deliver it over the side of a carrier or truck 6 "alongside," located at the end of the frame 1.

Figures 1, 2, 4:
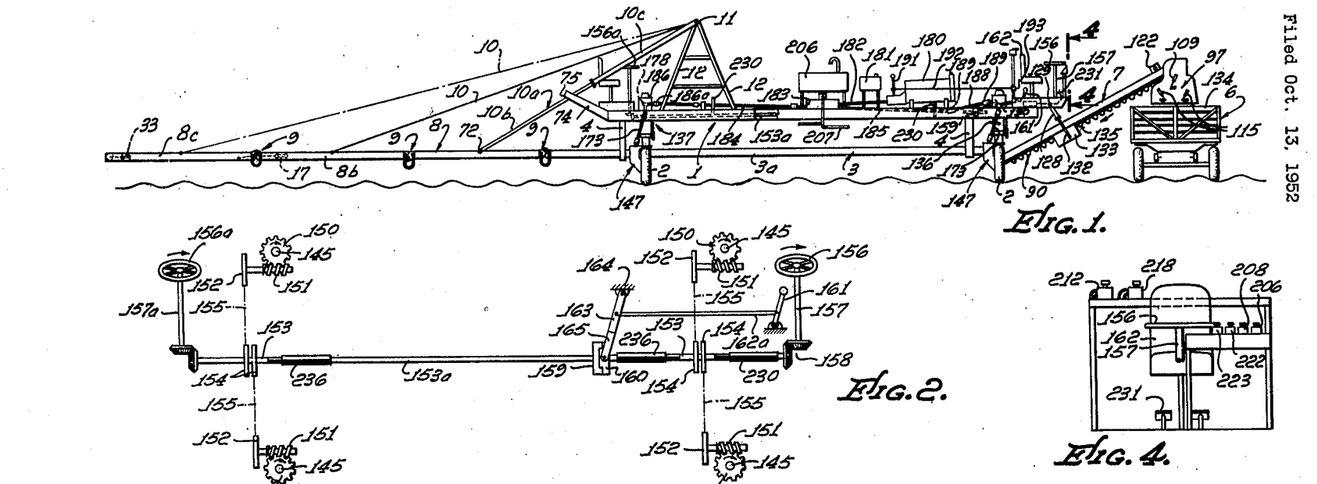
Figure 1 is a side elevation of the complete apparatus with the extensible portion of the conveyor means extended outwardly from the body or frame of the apparatus, and illustrating the delivery end of the conveying mechanism set up for delivering produce into a truck in a position to advance across the field with the apparatus.
Figure 2 is a diagrammatic view illustrating the double ended steering mechanism diagrammatically and illustrating coupling means for rendering the steering of the pairs of wheels at either end steerable independently of the pair of wheels at the other end.
Figure 4 is a front view of the dash projected upon the plane of the line 4—4 shown in Figure 1, but upon an enlarged scale.

In the present instance this is accomplished by means of a division or portion of the conveyor means that is an elevator-type of conveyor 7. Projecting laterally from the other end or side (with respect to the direction of advance) of the wheeled frame that constitutes a mobile vehicle to move across a field of produce to pick up extension, or receiving extension 8 is located, preferably composed of a plurality of articulated foldable sections 8a, 8b, and 8c connected together by joints 9. The sections 8a, 8b, and 8c, as indicated in Figure 1 are supported from above by stays or long links 10 and 10a the latter of which is extensible and retractable as will be described presently in detail. All of these links are freely or pivotally connected to an elevated point 11 on a superstructure of the frame 1. As shown this is an A frame, the legs 12 of which are cross-braced and anchored at their feet to the main frame 1 by suitable fastenings (not illustrated).

Referring particularly to Figures 1, and 7 to 10 inclusive, the end of the conveyor section 8a is articulated to the inner end of the conveyor 8b by means of one of the hinge joints 9 (see Figure 7) which includes hinge plates 13a and 13b disposed in pairs located respectively at the sides of the conveyor; each pair of hinge plates being connected by a hinge pin 14.

The section 8a is the innermost foldable section, and it will be noted, is the one to which the lower end the retractable lifting link 10a is attached. The section 8a is connected by a similarly constructed joint that connects to the left end 8 of the main portion of the conveyor.

The outermost section 8c is articulated to the outer end of the section 8b by similarly disposed hinge plates 15a and 15b that are connected together by a hinge pin 16 at each side of the conveyor, and in order to enable power to be employed to swing the section upwardly a motor or power cylinder 17 is provided, attached to the side of the section 8b. This is a fluid operated cylinder having a piston rod 18 that is connected to the section 8c to flex this joint 9. For this purpose I may use a sprocket chain 19 that meshes with the upper side of the sprocket wheel 20 at one end of one of the cross pins 16, and beyond each sprocket-wheel the end of each chain 19 is anchored to a lug 21 attached to the bottom flange 21 of the channel side of the section 8c (see Figures 7 and 9).

Figure 14:
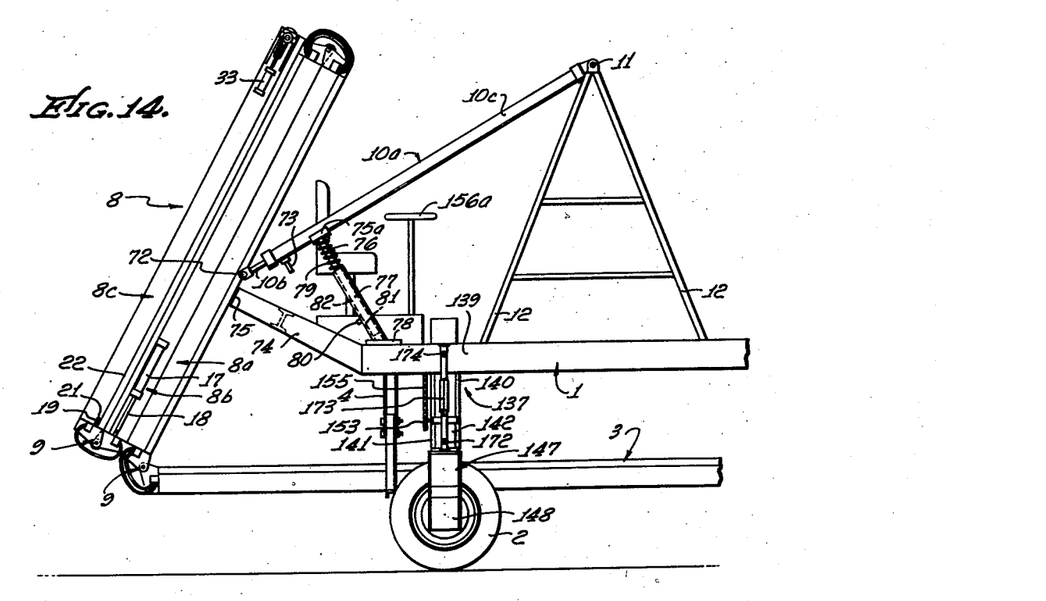
Figure 14 is a side elevation of the left end of the conveyor illustrated in Figure 1, but showing the same upon an enlarged scale and with the sections of this conveyor in a folded up or stowed condition against the adjacent end of the frame of the apparatus. This view further illustrates the means for effecting the lifting of the conveyor section to this folded position and for cushioning their impingement against a rest on the frame in the inclined position in which they are shown.

When the operating fluid is admitted to the outer end of the cylinder 17 through the connection or coupling 23, the piston-head in the cylinder 17 will be forced to the right and retracts the rod 18. By reason of the length of the radius from the axis of the pin 16 to the periphery of the sprocket-wheels 9 where the chain passes over it, a torque force will be developed that will swing the outermost section 8c in an upward direction. This will pull the movable conveyor sections up into a folded condition as indicated in Figure 14.

Again referring to Figure 14, connection boxes 15 for the operating fluid lines are provided; in order to carry the operating fluid past the joint 9 to the cylinder 17, a flexible hose connection 24 of U shape is provided to connect a pipe length 25 on the conveyor section 8a to another pipe section 26 which has a downwardly bent end 27 adjacent to the coupling 23 at the outer end of cylinder 17.

A similar pipe connection 28 is provided that is similarly mounted and which connects to a similar loop 29 of flexible hose that connects to a pipe length 30 that is attached to the side of the conveyor section 8b.

Adjacent the hinge-plate 15b this connects to a hose loop 31 which in turn connects to a pipe length 32 that serves a belt-tightener motor or fluid-operated cylinder 33 for tightening the belt of this conveyor that runs along through all of the folding sections of the left end of the conveyor 3. This conveyor belt and the details of this tightener will be described presently.

At this point, however, it may be said that the conveyor belt tightener includes two cylinders 33, one on each side of conveyor, and each of the piston rods 34 operated by these cylinders is connected to a rudimentary carriage or cross-head 35 guided for movement longitudinally at a long clearance slot 36 formed in the side, or web plates 37. Means for guiding these is illustrated, particularly in Figure 8. This guiding connection includes two T-angle irons 38 and 39 which are riveted or welded to the inside faces of the upper flange 40 and the lower flange 41 that project outwardly from the web-plates 37.

The middle portion of each carriage 35 is in the form of a hub 42 which operates as a bearing for a cross-shaft 43 and this shaft (see Figure 9) carries a tightener roller 44 around which the end loop of the belt 46 passes.

The shaft 43 passes through the side plates 37 at the slots 36. The roller or tightener pulley 44 is of relatively large diameter and is preferably constructed of two disc form heads 47 located at its ends to which a plurality of equidistant spaced slats 48 are attached, and at the middle of the pulley a similar intermediate disc 49 is provided as an inner brace for the slats.

Supporting rollers 50 maintain the belt 46 in a substantially horizontal position as it carries the load of produce toward and under the frame 1. These rollers 50 are spaced substantially uniformly throughout the length of this conveyor and have gudgeons or trunnions rotatably mounted in the inner side plates 52 of the conveyor frame.

At the location of the joints 9 a housing 53 is formed at each side that projects laterally out from the roller plates 52, and the outer sides of these housings are closed by the two hinge plates such as 13a and 13b, and 15a and 15b. These hinge plates touch against each other in a juxtaposed relation. At the joint 9 that is located between the section 8a and the section 8b a portion of the area of the plates 13a and 13b rest against a vertical flange 54 of an inclined side guard 55 that is a typical part of the cross-section of the conveyor to assist in guiding produce down onto the upper face of the conveyor belt 46 when supplied to the conveyor by the field pickers.

At the joint 9 that connects the outer end of conveyor section 8b to the inner end of section 8c the upper ends of the hinge-plates 15a and 15b may also overlie the flange 54. The shaft 16, between the side plates 52 carries a tubular spacer 56 that also operates as an inner brace for the plates 52 and for maintaining them in their proper alignment. On their outer sides the plates 52 have relatively thick collars 57 welded to them to function as bearings for the shaft 16.

Figure 7:
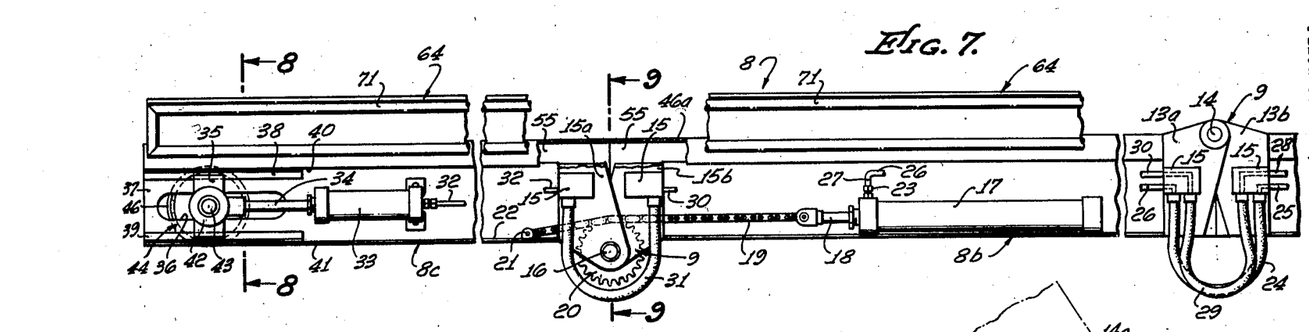
Figure 7 is a side elevation with certain parts broken away illustrating connected sections of the long conveyor and details of the means for tightening the conveyor belt and for employing power to swing the sections up into their folded relation when the apparatus is not in use, and also when it is to be moved along a roadway to or from the field where the produce is picked up.
Figures 8, 9, 10:
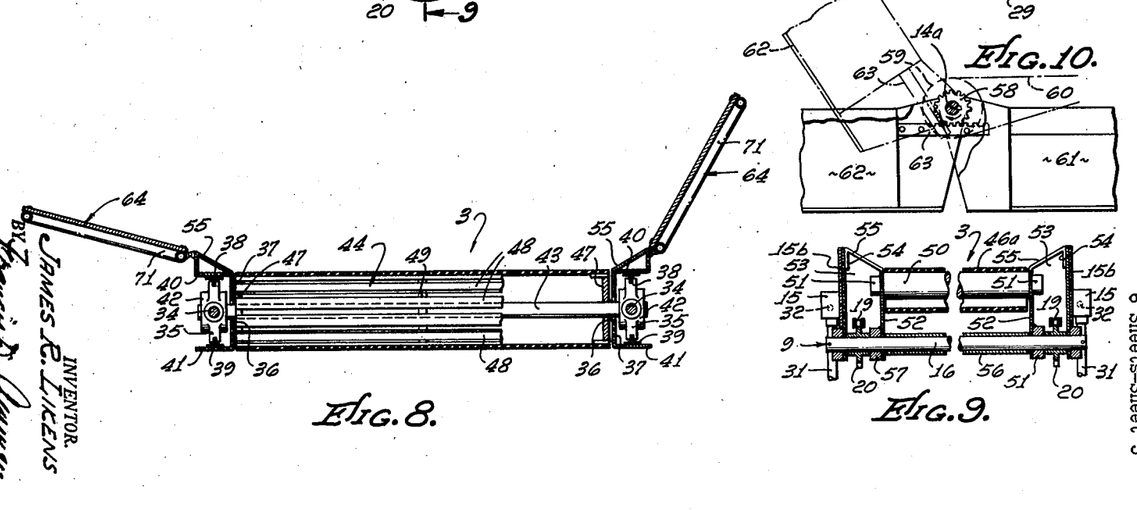
Figure 8 is a vertical cross section taken on the line 8—8 of Figure 7, and further illustrating details of the belt tightener mechanism for the long conveyor and also illustrating the side boards of the conveyor frame set in different positions.
Figure 9 is a vertical section taken on the line 9—9 of Figure 7 further illustrating the means for flexing a joint connecting two of the sections of the conveyor frame.
Figure 10 is a fragmentary view showing parts associated with the conveyor joint illustrated at the right end of Figure 7, and showing one of the conveyor sections in dotted lines in a partially folded state.

In Figure 10 I illustrate another embodiment of means which may be employed as a substitute for the chain and sprocket wheel construction illustrated in Figure 7. This type of power means for flexing these joints is illustrated as applied to the type of joint illustrated at the right of Figure 7 for connecting the section 8a to the section 8b. In this modification I provide one of its hinge pins 14a with a pinion 58 keyed to it and this hinge-pin carries a rigid sprocket-wheel 59 over which runs a sprocket-chain 60 indicated in dotted lines. This chain is driven by a small pinion-type slow moving sprocket-wheel and motor (not illustrated) that is secured on the right hand conveyor section 61. The left hand conveyor section 62 is provided with a rack 63 riveted or welded to it, the teeth of which mesh with the pinion 58. With this construction, it is evident that if the pinion 58 is rotated in a clockwise direction as indicated by the arrow, the rack 63 and the conveyor secton 62 will be swung up; such a movement is illustrated in dotted lines.

Figures 5, 6:
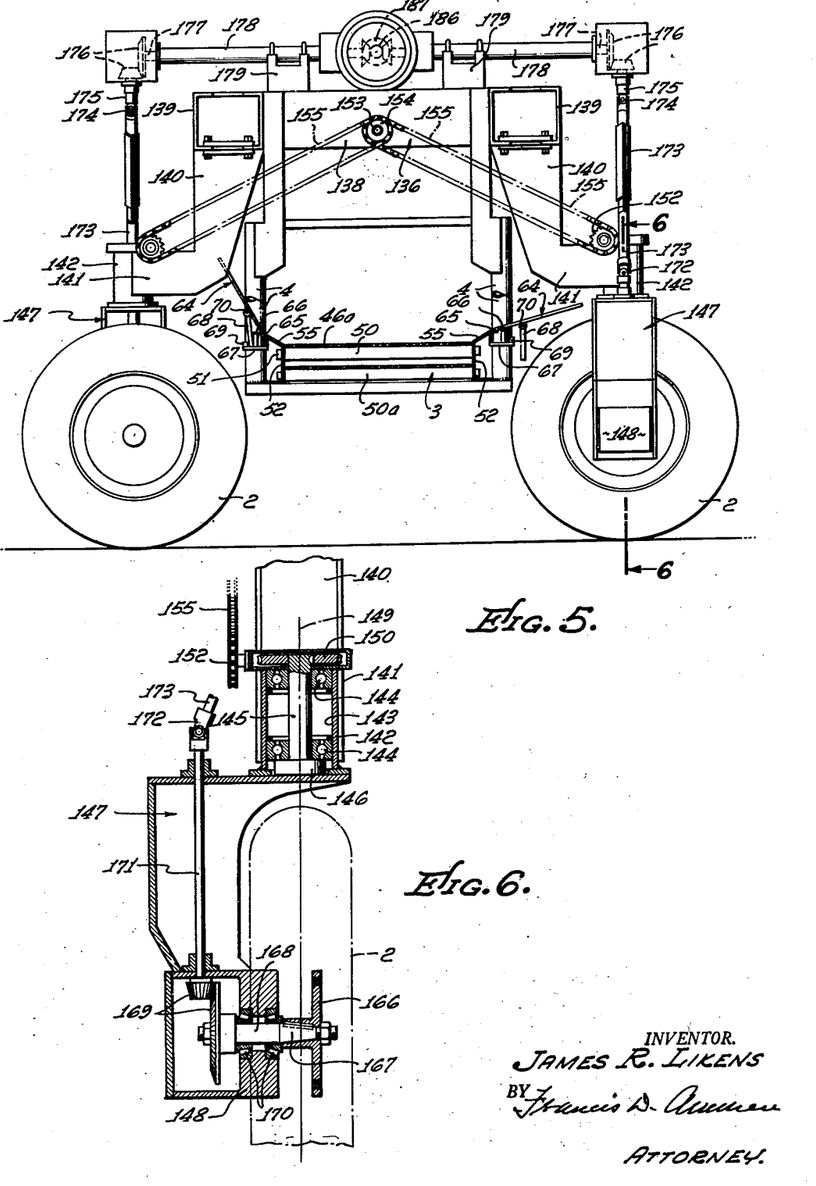

Throughout substantially the entire length of the conveyor its side guards 55, already described, are provided with relatively wide wing-plates 64. In Figure 8 one of these wing-plates is illustrated in a depressed position. In Figure 5 at the right this wing-plate is also shown in such a depressed position. This depressed position facilitates the handling of produce onto the conveyor. Each wing-plate can be rotated down to such a depressed position on its hinge connection 65 which attaches it to the outer edge of the guard 55, and near the hinge the wing-plate can rest on a fixed post 66 (see Figure 5) that extends up from a horizontal bracket 67 projecting out from the side of the guard 55.

In Figure 5 the means for supporting one of these wing-plates 64 in its nearly upright position is illustrated. This means includes a pendulum-type post or strut 68 that can be stepped at its lower end between the post 66 at the left and a small block 69, to hold the post fixed. The upper end of each post 68 is pivoted to lugs 70 on the under, or outer side of each wing-plate.

Figure 5 also shows the relation of the rollers 50 for the upper run 46a of the belt and their relation to the lower rollers 50a which are mounted in the side plates 52 in the same way as the upper rollers 50.

The wing-plates 64 may be made of plyboard or similar light material, stiffened by light rectangular frames 71 of tubular cross-section that are secured to their under sides. When the pickers are handling the produce to the moving conveyor belt, the wing-plate on the rear side of the conveyor, with respect to the direction of advance, would be held in a depressed position shown at the left side of Figure 8 and the right side of Figure 5. The inclination of these depressed wing-plates should be sufficient to enable melons, tomatoes, or other produce to roll down gently onto the belt without necessitating the picker waiting until that occurs. At any one spot or station, as a picker moves away after dumping his load of produce, another picker can take his place and move in to deposit his load.

Referring again to Figure 14, it should be noted that in this view the retractable link 10a that supports the innermost section 8a of the folding portion of the conveyor is in its retracted position, that is, with its piston-rod 10b in its retracted position. The end of this rod 10b carries a clevis 72 that is pivotally attached to the upper side of the conveyor section 8a, and when the jointed conveyor-sections are to be folded, swings this section up to the inclined position in which it is shown. To do this, of course, the operating fluid is admitted to the lower end of the cylinder 10c at the connection 73. When the innermost section 8a is pulled up to this position the two sections 8b and 8c stow themselves against the outer inclined side of the section 8a.

In order to cushion the swinging movement of the sections to their folded state in which they are shown in Figure 14, and also to provide a positive rest for the same in their folded position, I provide the adjacent end of the frame 1 with a pair of outwardly projecting arms that form a short boom 74, and the outer end of this boom is formed into an inclined seat 75 in a plane that accommodates it to the adjacent side face of the section 8a, but before the contact is made with the fixed rest 74, the side face of the cylinder 10c will engage a socket-form saddle 75 which has a shank 76 that can slide within a tubular guide 77. This guide is in an inclined position and extends up from the foot plate or foot attached to the frame 1 on its upper side or "floor."

A coil-spring 79 disposed around the shank 76 thrusts below against the upper end of the guide 77, and at its upper end thrusts against the back of the saddle socket at a considerably higher level than that in which it is shown in Figure 14. So, when the side of the cylinder 10c seats itself in the socket of the saddle the spring becomes compressed and resists the last part of the folding movement of the three folding conveyor sections. Of course, some means is provided such as a set-screw or stud 80 lying in a slot (not illustrated) in the wall of the guide 77. The ends of this slot would be located approximately at the points 81 and 82 on the side of the tubular guide.

Figure 11:
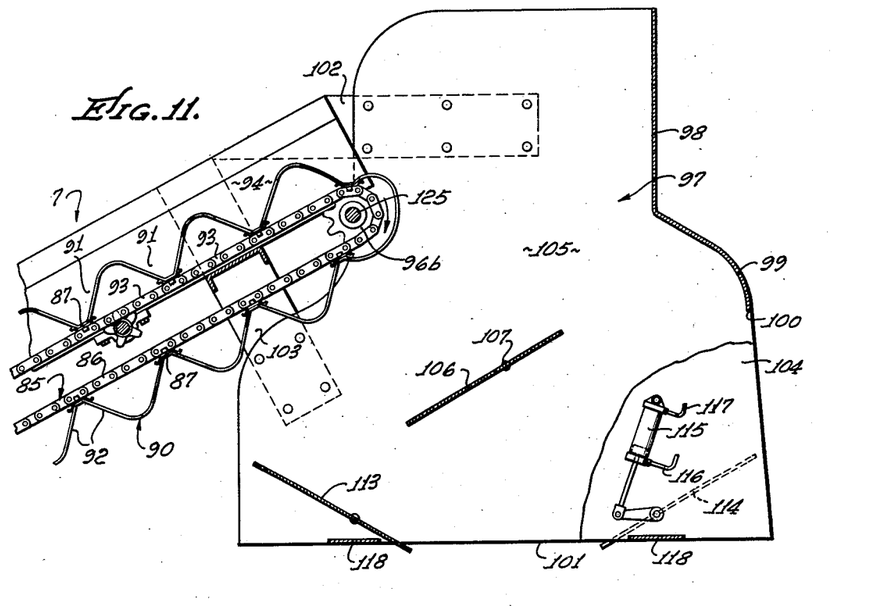
Figure 11 is a section taken in a vertical plane showing details of the upper end of a portion of the conveying mechanism and also showing in section a frame or hood connected with the same, together with means for mounting and controlling baffles or baffle means for controlling the equable delivery of the produce to the floor of the carrier or truck to which the conveyor mechanism delivers.
Figures 12, 13:
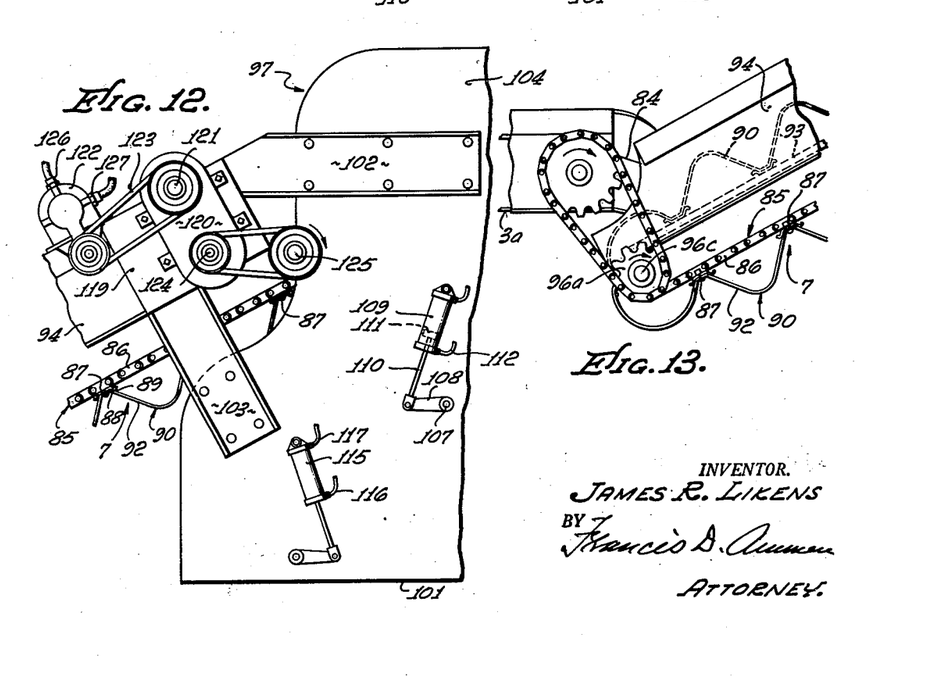
Figure 12 is a side elevation of the parts shown in Figure 11 with the right end of the hood broken away, that is, the side portion of the hood that is disposed opposite to the end of the conveyor mechanism. This view particularly illustrates the power driving mechanism for actuating the conveyor.
Figure 13 is a fragmentary view showing in side elevation the connection between the delivery end of the main conveyor to the receiving end of the elevator type of conveyor that carries the produce up and delivers it into the distributing hood shown in Figures 11 and 12.
Figure 16:
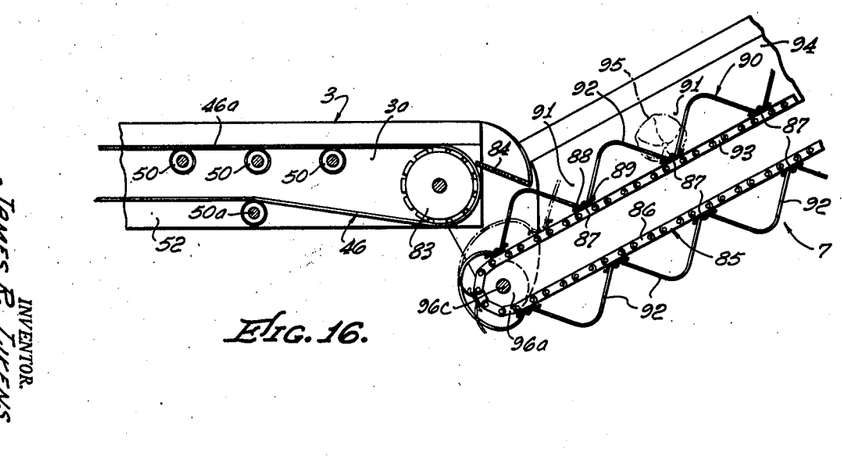
Figure 16 is a vertical section taken through the delivery end of the main conveyor just inside of one of the side plates thereof and similarly located on the elevator type conveyor to which the main conveyor delivers the produce.
Figure 17:
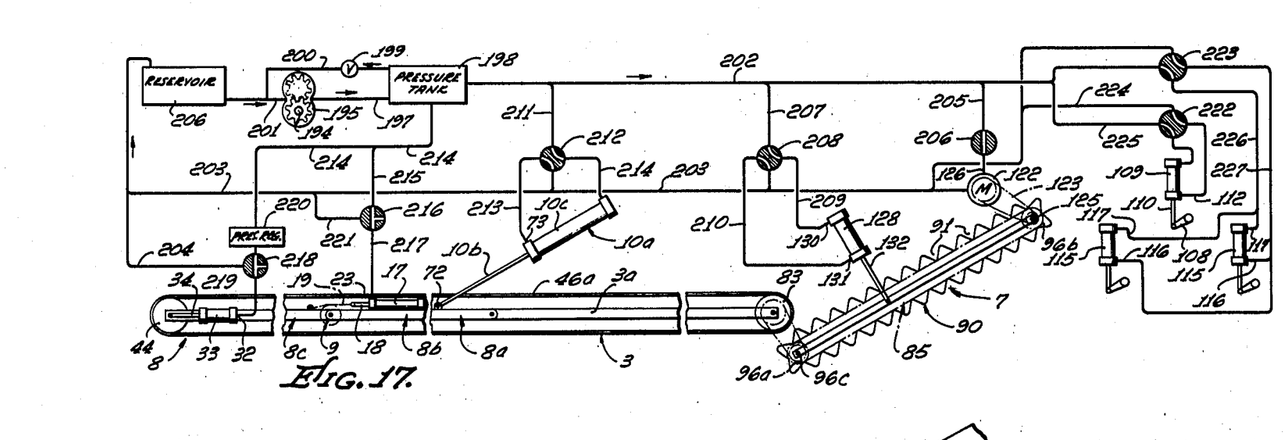
Figure 17 is a schematic diagrammatic view illustrating a general arrangement of the hydraulic system or fluid pressure system, together with the controls for the same, and the connections to the different mechanisms referred to hereinabove incidental to the functioning thereof.

Referring now particularly to Figures 11 to 13 inclusive and Figures 16 and 17; Figure 16 illustrates in detail the delivery end of the conveyor-means already described. The delivery end of the conveyor belt 46 passes around a drum-type pulley 83 preferably having a slatted periphery like the tightening pulley 44 as shown in Figure 7. Adjacent the end pulley 83 the belt 46 delivers the produce onto a short inclined ramp 84 down which the produce passes to the elevator-type conveyor 7 already referred to above. This elevator provides spaced pockets preferably extending transversely across it, into which the produce passes from the ramp 84. In order to enable this conveyor to present such a feature I prefer to provide two spaced-apart flexible endless belts or chains 85. These are preferably in the form of two sprocket chains composed of links 86, and on their outer sides at spaced points the links are connected by transverse bars 87 preferably formed of flat material with upwardly inclined short flanges 88 the edges of which are bent downwardly. This downward bend at each side enables these bars or battens to present curved upper faces 89 near the bent down portions that prevent the ends of the flanges from cutting into the clothing 90 or covering that is secured to the outer faces of the battens by rivets or other suitable means. While short pieces of material may be used to form the individual pockets 91, which extend transversely as described, I prefer to form these pockets 91 from a long sheet of material which is attached lengthwise on the elevator, and so that it is disposed in a series of outwardly extending abutments 92 of substantially V shape; and so that between the abutments the transverse pockets 91 or "valleys" are formed.

The upper runs 93 of these chains 85 lie between two side-plates 94 which close the ends of these transverse pockets and co-operate with the same to enable the moving conveyor to raise the produce sufficiently to enable it to deliver the produce into a carrier 6 which may be in the form of a truck located under the upper end of the elevator.

The material that I prefer to use as this clothing for the chains 85 is a sheet of rubber material that has enough stiffness to enable it to maintain itself naturally in substantially the shape indicated in the drawing.

However, it should be evident that on the upper run of the elevator the sides of the pockets 91 or "valleys" that form the wall at the lower side of each pocket should incline downwardly toward the direction of advance of the pockets. This assures that the produce will stay in the pockets.

In Figure 16 is indicated in dotted outline at 95, the manner in which one of these pockets will operate to carry produce such as melons. However, it is obvious that these pockets will function to elevate any kind of produce to deliver it into a truck accompanying the apparatus across a field. The clothing forming the pockets 91 should be applied so that the attached points for the material are far enough apart to insure that it will not be placed in tension as the pockets are passing around the sprockets such as the sprockets 96a and 96b shown in Figures 11 and 13. This result can be readily attained if the sprockets are made of sufficiently small diameter. By making them in that way will also economize space by bringing the two runs of the chains relatively near to each other. The shaft 96c of sprocket 96a pivotally supports the frame of the elevator 7 on the frame of the horizontal conveyor 3 (see Figure 16).

Figures 1 and 11 illustrate means for breaking the fall of produce delivered into the carrier or truck 6, and at the same time distributing the produce equably to the truck floor. In order to accomplish this a distributor frame 97 preferably in the form of a hood is provided.

The hood illustrated is open on three sides and closed on the fourth side which is remote from the end of the elevator. That side has a wall 98 of sheet material, the upper portion of which is substantially vertical and terminates below in an outwardly extending apron 99 the lower edge 100 of which is at a considerable distance above the bottom edge 101 of the hood.

The hood 97 is secured by gusset plates 102 and 103 to the side plates 94 of the elevator.

Between the side walls 104 and 105 of the hood 97 a plurality of baffle means are provided. This preferably includes separate baffles. The organization or disposition of these baffles should depend upon the character of the produce that the apparatus is handling. In the present instance I illustrate an organization that is adapted for use with produce such as melons, tomatoes, or produce of that nature.

As illustrated in Figures 11 and 12, I provide an upper baffle member 106 in the form of a plate mounted to rotate about the axis of two trunnions or gudgeons 107 rotatably mounted in the plates 104 and 105, and one of the gudgeons 107 is provided with means for regulating the inclination or angle at which this baffle plate is set. For this purpose I provide a lever or arm 108 on the outer side of one of the side plates 105. To this arm any suitable means such as a fluid operated cylinder 109 is connected, for example through the medium of a piston rod 110 carrying a piston 111 within the cylinder. The set position of the arm 108 shown in Figure 12 corresponds to the position of the baffle plate 106 shown in Figure 11. If however, operating fluid were admitted through the hose 112 to the lower end of the cylinder 109 the piston 111 would be driven upwardly and the baffle plate 106 would then be rocked over to an opposite angle of inclination, so that any produce delivered onto it would pass over toward the right instead of toward the left, within the hood, as viewed in Figure 11.

It is preferable to have the trunnions or gudgeons 107 located so that in either of the positions mentioned for the baffle plate, there will be more area of the plate below the trunnions than above the same. Hence, the weight of the larger area of the plate will act as a counterbalance to maintain the baffle in the position in which it was left.

In addition to the baffle means 106 I also prefer to provide two other baffles 113 and 114 which are disposed laterally with respect to the vertical plane passing down through the gudgeons of the main baffle 106. These baffles are mounted similarly to the baffle 106 and controlled in the same way by means of fluid operated cylinders 115 connected up in the same way as described above in connection with the baffle 106; and they are controlled by the admission of operating fluid through hose connections 116, 117, that deliver the operating fluid respectively below or above their pistons. In the position of the baffles 113 and 114 in Figure 11 all of the produce that descends onto the baffle 113 will be deflected or guided by the same toward the middle front and rear plane of the hood. However, if the baffle plate 113 should be tipped downwardly at its left side instead of upwardly the produce would be guided off towards the left side of the carrier below the hood. The baffle 106 can co-operate in the same way with the other baffle plate 114 to enable the produce to be guided toward the medial front-and-rear plane of the hood or over toward the right of the carrier as viewed in Figure 11.

In order to facilitate supporting the frame or hood 105 above the truck 6 the hood may be provided with two longitudinally attached base-plates or stringers 118 welded to the plates 105. They extend beyond the plates 105 of the hood so that they can rest upon the upper edges of the truck walls at the front and rear thereof. These two flat rails or plates if desired, may be stiffened by angle irons attached to them, in which case they can operate to support a portion of the weight of the elevator conveyor 7.

Any suitable means may be provided for driving the conveyors. As illustrated in Figure 12, adjacent the gusset plates 102 and 103, one of the side plates 119 of the elevator housing serves as a mounting for a reduction gear mechanism in a gear-box 120. The drive shaft 121 of this gear-box is driven from a motor 122 by any suitable means, for example, by a belt 123. The driven shaft 124 of the reduction-gear drives the shaft 125 that carries the sprocket-wheels 96b for the upper ends of sprocket chains 85.

The motor 122 is preferably of rotary type driven, or supplied with operating fluid by means of flexible hose attached to the connections 126 and 127.

Referring now to Figures 1 and 17; these figures illustrate power operated means for raising the delivery end of the elevator-type conveyor 7 to enable the hood 97 to be lifted high enough to adjust its lower edge onto the carrier or truck 6 that is to receive the produce. In order to accomplish this I provide a power operated or fluid-operated cylinder 128, the upper end of which is connected by a pivotal connection or attachment 129 to the forward end of the frame 1 of the apparatus.

This cylinder 28 is provided with connections or couplings 130 and 131 which are supplied with the operating fluid as will be presently described. It operates the piston-rod 132, the lower end of which is pivotally attached to the side of a wiper-housing 133 which is mounted on the under-side of the frame of the elevator conveyor.

By operating cylinder 128 the inclination of the elevator 7 can be regulated. In Figure 1 the hood 97 is shown supported in position just above the upper edge of the crib-frame 134 of the truck. When in this position the control valves for the lower end of the cylinder 128 would be opened sufficiently to release some of the fluid in the lower end of the cylinder 128 and this would permit the hood to settle down onto the cradle-frame of the truck. In adjusting the hood 97 into position this operation is facilitated by the fact that the side plates 105 of the hood are pivotally attached on trunnions or shafting coaxial with the shaft 125.

Referring again to the wiper housing 133, it should be understood that as the lower runs of the chains 85 move downwardly past the wiper housing 133 the clothing 90 comes into contact with a transverse curved wiper 135 carried by the upper end of the housing 133, and as the clothing passes into and through the housing 133 its transversely extending abutments or "peaks" between the pockets 91, engage the convex face of a wiper 135. This wiper is a transversely curved metal plate, and operates to dislodge any dirt or other foreign matter which may have become picked up from the produce by the elevator.

As stated heretofore, the frame 1 is supported on ground wheels 2. These ground wheels are preferably four in number, one pair located toward the forward end of the frame 1, that is to say, the end of the frame that is the one that is disposed forwardly when the implement is proceeding along a roadway. These ground wheels are of course, heavy duty wheels, with heavy duty pneumatic tires.

The means for driving these wheels to move the implement along the roadway or across the field, and the means for shifting them into planes transverse with respect to the longitudinal axis of the frame will now be described, with particular reference to Figures 1 to 6, and 14 and 15.

Adjacent each end the frame 1 includes two transversely disposed housings, that is, there is a forward housing 136 shown in detail in Figure 5, and a rear housing 137 shown on a smaller scale in Figure 1, located at the rear end of the frame 1. These two housings are substantially alike in construction and mode of operation, and so is the mechanism associated with each housing to orient the two wheels, to steer them, and to drive them by power when moving the frame about. All these means are substantially identical for both these housings; so, the description of the forward housing 136 and the mechanism associated therewith, particularly illustrated in Figures 5 and 6, should be understood also to be a description of the housing 137 and its associated parts.

The housing 136 includes a cross-head 138 with two box form ends or heads 139 at its ends, respectively, and on the under side of each of these box-heads a wheel bracket 140 is attached that extends downwardly to a laterally extending foot 141. Each foot 141 projects outboard, and the outer end of each foot 141 is formed into a wheel post 142 presenting a cylindrical inner wall 143 (see Figure 6) which houses two spaced roller-bearings 144 for a vertically disposed king-pin or spindle 145, having a large integral collar 146 rigid with the same at its lower end which is welded or otherwise secured to a wheel housing 147. The body of the wheel housing is offset laterally as indicated in Figure 6, and its lower end is formed into a bearing housing or box 148 to carry one of the wheels 2 located so that the medial plane of the wheel is substantially in line with the axis 149 of the king-pin or vertical spindle 145.

The upper end of the king-pin 145 is connected to mechanism for rotating it to effect the steering of the wheel, that is to say, to orient the wheel on the axial line 149. This means for rotating the king pin is preferably a one-way drive mechanism. In other words, while the mechanism can rotate the king-pin, the kingpin cannot rotate its driving mechanism. For this purpose I employ a worm-wheel 150 rigid with the kingpin, and that meshes with a worm 151 supported on the foot 141 (see Figures 2 and 5).

The shafts of the two worms 151 carry sprocket wheels 152 or other means for rotating them from a common drive shaft 153 located toward the forward end of the frame 1 which drive shaft carries two sprocket wheels 154 in line respectively with the sprocket wheels 152 to enable sprocket chains 155 to rotate them.

Referring particularly to Figure 2 in connection with Figure 1, the shaft 153 can be rotated at will by a steering wheel 156 at the forward end of the frame 1, the steering column 157 of which rotates the shaft 153 through bevel gears 158. Each worm 151 is located on the inner side of its corresponding worm-wheel so that worms of the same character of thread can be employed, the rotation of which in the same direction will produce angular rotation of the spindles or kingpins 145 in the same direction. In other words, the medial planes of the two wheels will be maintained substantially parallel with each other for any degree of rotation of the steering wheel.

This steering mechanism is duplicated at the other end of the frame 1 which is the end I call the rear end. The steering wheel 156a at that end can orient the rear wheels independently but in the same manner as the forward wheels can be oriented when the two steering means are not inter-connected.

Means are provided for enabling all of the wheels to be rotated on their kingpins 145 at will to shift them from a position in which their medial planes are parallel with the longitudinal axis of the frame 1, so as to set them in transverse planes extending at right angles to the longitudinal axis of the frame 1. This is the position the wheels must have when the implement is being advanced across the field. In order to accomplish this I provide a shaft 153a (see Figure 2) that runs forward from the rear steering mechanism and is in alignment with the shaft 153.

Between the ends of these two shafts 153 and 153a a clutch composed of two clutch members 159 and 160 is provided, which clutch can be opened or closed by means of a hand lever 161 near the driver's seat 162 at the front of the frame. This lever 161 is connected by a link 162a to a parallel lever 163 mounted on a fulcrum 164 and provided with a yoke 165 that operates the clutch-member 160 to open or close the clutch. Of course, when this clutch is open the hand wheel 156 cannot steer the rear wheels, and that is the position or condition of the clutch when the apparatus is being driven along a roadway and being steered from the front end only. Of course, in ordinary driving along a roadway the rear wheels should be left with their medial planes "set" in a front-and-rear plane, but when the clutch is open a man on the rear seat can co-operate with the forward driver in maneuvering the implement as may be desired.

Referring again particularly to Figures 1, 5, and 6, the drive to the wheels 2 to rotate them on their centers includes a driving disc 166 (see Figure 6) having means for enabling the same to be bolted to the hub (not illustrated) of its wheel 2. This driving disc has a tapered socket to receive the cone 167 on the wheel arm or spindle 168 which is rotated through the bevel gears 169. The housing 148 carries cone bearings 170.

The pinion of the bevel gears 169 is carried on the lower end of a substantially vertical shaft 171 having its bearings in or on the wheel bracket housing, and the upper end of which attaches to a universal joint 172, the driving member of which is mounted on an inclined shaft 173. The upper end of shaft 173 carries the driven member of a universal joint 174, the driving member of which is attached to the lower end of the stub shaft 175.

Referring to Figure 5 the stub shafts 175 are driven through bevel gears 176 at the ends of a cross-shaft 177 mounted in a tubular housing 178 set on pedestal bearings 179.

As illustrated in Figures 1, 3, 15 and 17 the powerplant includes an internal combustion motor 180 supplied with liquid fuel from a fuel tank 181 by a pipe connection (not illustrated). This motor 180 drives a power-shaft 182 that leads to a power take off or transmission 183 from which two shafts 184 and 185 lead off longitudinally of the frame 1, the former of which leads back and connects to a shaft 186 through universal joints 186a, and the shaft 186 through bevel gearing 187 drives the two shafts 177 heretofore described (see Figure 5). The drive down from this point includes the parts illustrated in Figure 5 that effect the driving of the ground-wheels 2 shown in Figures 5 and 6, about their centers.

The other shaft 185 that extends forward drives an inclined shaft 188 through universal joints 189 and a similar universal joint 189 drives a horizontal shaft 190 that passes to the middle point of a forward axle similar to the axle 148 shown in Figure 5, and there through bevel gearing identical with the bevel gearing 187 drives the forward ground wheels 2.

At the rear end of the motor 180 a throttle lever 191 is provided controlled from the front seat 182 through a long link 192 having a handle 193 within reach of the driver for operating the same. A clutch for the motor shaft would be provided but is not illustrated.

When the shaft 182 is driven it drives a shaft 194 (see Figure 3) that drives the pump 195 which is preferably of the gear type illustrated in Figure 17. The pump 195 develops the necessary pressure in the operating fluid for the fluid-operated apparatus. Though compressed air could be employed as an operating medium, I prefer to employ hydraulic apparatus, the liquid being delivered through a delivery pipe 197 to a pressure tank 198 connected up to a relief valve 199 through a by-pass connection 100 to the inlet side of the pump connection 201.

From the pressure tank a high pressure main 202 extends, from which branches extend off to the different control valves of the system, and some of these branches connect to two return pipes or hose lines 203 and 204. A main branch line 205 leads to a tank control valve 206 that delivers the fluid under pressure to a hydraulic motor 122, the outlet from which is connected to the return line 203.

The motor 122 as already described, drives the conveyor, as shown in Figure 12 through a chain or belt 123 to rotate the shaft 125 at the upper end of the elevator-type conveyor 7. In connection with the showing of this chain or belt 123 in Figure 17, it should be understood that Figure 17 is a diagrammatic view and it omits the specific organization of the parts as shown in Figure 12.

Another branch line 207 extends down to a 2-way cock or valve 208 that controls the delivery and exhaust of operating fluid through pipe connections 129 and 210 for the cylinder 128 that functions to raise, and to support the upper end of the conveyor 7 within the limits, of course, of the cylinder 128.

A third branch connection 211 serves a 2-way cock or valve 212 that controls delivery to, and exhaust from, the cylinder 10a already described for lifting the first sections 8a of the horizontal conveyor up to their folded position in which they are shown in Figure 14. This is effected through hose connections 213 and 214 leading respectively to the lower end, and upper end of the cylinder 10a. Likewise, if the plug of valve 216 is oriented through 90 degrees in a clock-wise direction the pressure in cylinder 17 and in its feed line 217 can be relieved through the return branch 221 that leads to the return main 203. The control valves for the cylinders 111 and 115 for the baffles 106, 113, and 114 in the distributor head 97 are illustrated diagrammatically as the valves 222 and 223 at the right of Figure 17, including the supply branch 224 for the cylinder 109 with its return line 225, and including the branch supply connection 226 supplying the two cylinders 115 that operate the lower baffles; a common return line or branch 227 is provided.

All of these control valves that serve the fluid actuated cylinders and the motor 122 are placed in a convenient position to be reached by the operator of the apparatus at the front seat 162 (see Figure 4).

Figure 3:
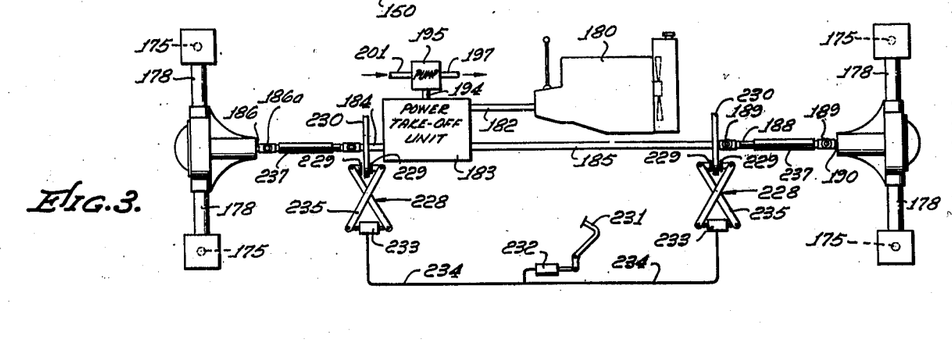
Figure 3 is also a diagrammatic view illustrating the power take-off and a motor for driving the same and also a conventional brake mechanism which enables brakes to be applied at two points on the longitudinal drive shaft through which the drive to the ground wheels is effected.

Braking means of any suitable construction may be used for use principally when the implement is being driven to and from the field. In Figure 3 I illustrate diagrammatically conventional brakes 228 for applying brake-shoes 229 to the opposite sides of two brake discs 230 on the power shafts 184 and 185. These discs are located preferably near the universal joints 187 and 199. The brakes can be applied by a pedal 231 located in a convenient position to be reached by the driver at the front seat 162. The brake-pedal actuates a master cylinder 232 that raises the pressure in dual-type brake cylinders 233 receiving their pressure through the two branch lines 234 that lead to the cylinders. Their piston rods that extend out from the heads of these cylinders actuate scissors-type brake levers 235 that apply the brake-shoes.

As the steering apparatus I employ shafting 153, 153a, and the drive-shafting 184, 185 are so long, I provide slip connections 236 and 237 in them to allow for slight variations in alignment of their bearings. The slip-joints are of angular cross-section to transmit the torque in the shafting.

Although I have described and illustrated the apparatus in operation as advancing with the wheels 2 rotating in a plane at right angles to the longitudinal axis of the frame of the implement, it is obvious that if desired it could be advanced through the field in a direction parallel to its longitudinal axis. In that case, the carrier or truck 6 could be located just forward of its forward end; for instance, this method of using the implement could be adopted where it was necessary to finish up a narrow strip of field of inconsiderable width. For this reason it should be understood that in using the term "side" or "end" in the specification and claims either of these terms describes any boundary end or side of the implement. In other words, as shown in Figure 1, the portion of the implement at the left of this figure can be considered the left side while the opposite portion at the right can also be considered as located at the right side.

And when the implement is being advanced in a direction parallel with its longitudinal axis, the operator seats 193 can be considered as located at the ends of the implement. Furthermore, it would be an obvious modification of the invention to place the dash and the control apparatus at the left end of the implement frame as viewed in Figure 1, in which case the implement could be advanced across the field with the folding sections 8 of the main conveyor disposed toward the front, which would enable the driver to have a clear view of the operations, and movements of the pickers. In that arrangement of course, the truck 6 would move along with the implement but at the implement's rear.

The general mode of operation of the implement will now be briefly stated.

Figure 15:
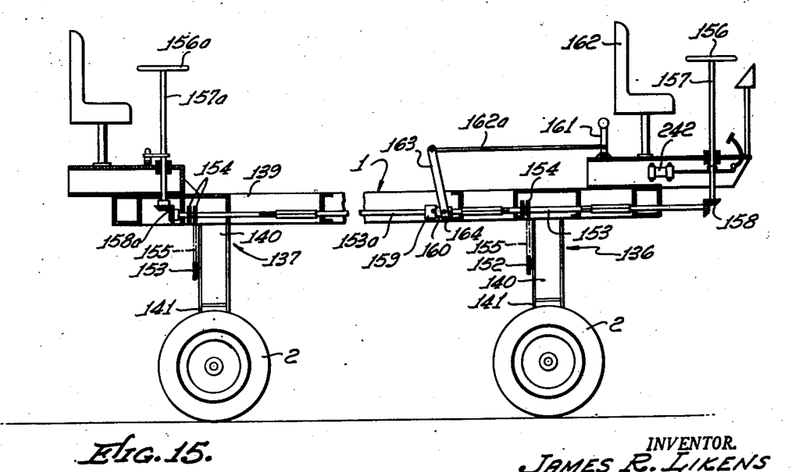
Figure 15 is a vertical section of the frame of the apparatus broken away at its middle portion and showing details of steering mechanism for the wheels.

When the implement is being moved along a roadway toward or from the location of the field, where it is to gather the produce, the boom portion 8 of the main conveyor would be held in its folded position in which it is illustrated in Figure 14; and the ground wheels 2 would be disposed in the position in which they are shown in Figures 14 and 15.

In order to hold the portion 8 of the conveyor in this folded condition sufficient fluid under pressure would be admitted into the cylinder 10c through the connection 73 to hold the folding sections securely in position.

When the implement arrives at the field, the hydraulic valve 212 that controls the supply of operating liquid to the power cylinder 10a would be opened to enable the liquid in the cylinder to flow out on the return pipe 203 (see Figure 17), but the valve 212 in this operation should be choked somewhat so as to prevent the folded sections from falling down or descending too rapidly toward the ground level after the folded sections have passed their vertical position. In starting the downward movement of the folded sections the valve 212 would be placed in a position in which the two valve ports are slightly lapped at their inlets and outlets in the pipe system; this insures that the movements of the piston 10b would be constantly under complete control.

When the sections extend themselves into a substantially horizontal position as shown in Figure 17, the valve 218 should be cracked slowly toward the position in which it is indicated in Figure 17. This would admit the liquid under pressure to the cylinder 33 and place a safe tension on the conveyor belt 46a.

However, this operation is made safe as far as any danger of subjecting the conveyor belt 46a to too much tension, by reason of the presence of the pressure regulator 220. In practice, a pressure gage (not illustrated) may be used in the delivery connection 219 to keep the operator informed as to what pressure exists in the cylinder 33.

In addition to extending the folding conveyor under ordinary circumstances, the steering wheel 156 and/or the steering wheel 156a would be manipulated to actuate the steering sprocket chains 155 to actuate the worms 151 (see Figures 2 and 6). They function to "set" the ground wheels by rotating their king-pins 145. Their oriented position determines the plane in which the ground wheels 2 will rotate on their arms 167. Having accomplished the reorientation of these wheels to their transverse position such as shown in Figures 1 and 5, the operators of the apparatus would then control the valve 208 (see Figure 17) to extend the link or piston rod 132, thereby adjusting the inclination of the elevator-type conveyor 7 which delivers the produce into the truck 6. In doing this, of course, the truck would be first put in position beneath the distributor hood 97 to enable the hood to descend into position substantially over the longitudinal axis of the truck, as illustrated in Figure 1. The implement would then be all set to proceed across the field.

The propelling motor 180 would now be started which would set in operation the mechanism of the power take-off unit 183, which drives the shafting 184 and 185 (see Figures 3 and 5). At the front and rear end the shafting 190 and 186 would effect the driving of the cross-shafts 177 (see Figure 5), and the bevel gears 176 would drive the inclined shafting 173, the lower ends of which, through the universal joints 172 (see Figure 6) would drive the vertical shafts 171 to rotate the ground wheels 2.

The apparatus is then ready to proceed across the field, but before doing so the side-boards 64 should be adjusted properly (see Figure 8). The side-board at the left is shown adjusted into a depressed position and this would be the side on which the pickers would deliver the produce, which would then roll down the slightly inclined side-board and across the ramp 55 onto the belt 46a.

The upper run of this belt, of course, moves from left to right as viewed in Figure 1, and delivers the produce to the lower end of the conveyor 7.

After the hood 97 has been adjusted into position over the truck the operator of the implement starts up the motor 122 (see Figures 12 and 17) which effects the driving of the upper end of the conveyor belt 85 (or chain) for the conveyor 7 and the lower end of this belt rotates the shaft 96c which, through the sprocket chain, 96d (see Figure 13) drives the conveyor belt 46a.

After the implement has completed its work in the field, it is necessary to fold up the sections of the main conveyor into its folded condition shown in Figure 14. In order to accomplish this the operator opens the valves 212 and 216 (see Figure 17) to the positions in which they are shown in that figure, and this admits the hydraulic liquid under pressure into the left end of each of the cylinders 10a and 17. Just before admitting the liquid under pressure to these cylinders however, it is advisable to make the proper control of the valve 218 to cut off pressure of the liquid to the belt tightener cylinder 33. The cylinder 10a of course, raises the section 8a of the conveyor frame 3a, rotating this section 8a about its right hand joint 9 that connects it to the main section 3a of this conveyor; and the cylinder 17 operates the sprocket chain 19 to swing the section 8c upwardly about its joint 9 that connects it to the section 8b.

Many other embodiments of this invention may be resorted to without departing from the spirit of the invention.

I claim and desire to secure by Letters Patent:

1. A produce loader for use in the field, comprising an elongated main frame having an elevated floor, a pair of ground wheels at each end of said frame, each of said ground wheels mounted on the main frame to swivel on a vertical axis located in the plane in which the wheel rotates, an endless belt conveyor supported on the frame below the said floor, and between the said pairs of wheels, and extending outwardly from the frame at one end thereof for receiving the produce picked by harvester hands; and its other end disposed adjacent to the other end of the wheeled frame, a motor supported on the main frame, means driven by the motor, driving the ground wheels, hand-controlled means adjacent the floor for orienting the ground wheels on their said vertical axes for setting them with their planes of rotation parallel to the longitudinal axis of the main frame, to enable the produce loader to be driven along a roadway to and from the field, and for setting the wheels in position with their planes of rotation perpendicular to the longitudinal axis of the main frame for advancing the main frame laterally across the field when loading the produce onto the conveyor.

2. A produce loader for use in the field according to claim 1 in which the means for orienting one of said pairs of wheels on their said vertical axes includes a wheel-housing carrying the wheel and supported on the frame for rotation on the said vertical axis, with a worm meshing with the worm-wheel, and rotatably mounted on the frame; and in which the said hand controlled driving means includes a shaft with a clutch through which the wheel housing is swung about its vertical axis; said clutch when held open enabling the said worms to maintain the wheels of said pair set with their planes of rotation parallel to the longitudinal axis of the elongated frame when running the produce loader along a roadway; and in the other position in which their planes of rotation are perpendicular to the longitudinal axis of the said frame.

3. A produce loader according to claim 1, in which a pair of said wheels at one end of the frame are provided with means for rotating the same on their said vertical axes, for steering the vehicle, and in which the other pair of wheels have worm-wheels connected with the wheel mountings, and worms meshing with the same for rotating them on their vertical axes, said worms capable when unactuated to maintain the second named pair of wheels in a set position in which their planes of rotation are parallel to the longitudinal axis of the frame.

4. A produce loader for use in the field, according to claim 1, in which said conveyor belt is located at about the level of the ground wheels, and above the plane of their axes of rotation, said endless conveyor having a frame with side guard plates, their lower edges being supported on the conveyor frame at the sides of the endless conveyor, and inclining downwardly toward the longitudinal axis of the elongated main frame, and wing-plates hingedly attached to the upper edges of the guard plates.

5. A produce loader for facilitating moving a crop from a field onto a truck advancing with the loader across a field, comprising in combination an elongated frame structure having a substantially horizontally disposed longitudinally extending conveyor supported thereby, said conveyor having open unobstructed longitudinally extending slides freely accessible to pickers walking across a field adjacent the conveyor which enables them to pick and lay produce directly on the conveyor and to thereby be advanced toward a truck, at least four ground-engaging wheels supporting the frame structure, said wheels being disposed in opposite pairs located respectively adjacent the ends of the frame structure, a swivel mounting means for each wheel, said mounting means mounting the respective wheels to the frame structure for individual swiveling rotation between first positions wherein said wheels are all oriented in vertical planes disposed substantially transverse to the frame structure and second positions wherein the wheels are all oriented in vertical planes disposed substantially longitudinal to the frame structure with the swiveling rotation of each wheel being about a central vertical axis lying in the vertical plane of the respective wheel, an operator's support located at one end of the frame structure; an extension of the conveyor extending beyond the one end of the frame structure for delivering produce to a truck, steering means located at the one end of the frame structure, connections between the steering means and the wheels for orienting said wheels to the said first and second positions and holding the wheels in the so oriented positions, power means on said frame structure for rotating the wheels to transversely advance the frame structure across a field when the wheels are oriented to the first position, and to longitudinally advance the frame structure along a roadway after departing from a field when the wheels have been oriented into their second position, and means including a clutch for opening the connection between the steering means and the pair of wheels at the end of the frame structure remote from the steering means so that the pair of wheels at the remote end are held in the second position while the other pair of wheels remain steerable by the steering means to enable the frame structure to be steerable while traveling along a roadway.

References Cited in the file of this patent

UNITED STATES PATENTS

| | | |
|---|---|---|
| 43,971 | Clark | Aug. 30, 1864 |
| 775,456 | O'Shaughnessy | Nov. 22, 1904 |
| 1,056,734 | Brown | Mar. 18, 1913 |
| 1,382,909 | Hennessy et al. | June 28, 1921 |
| 1,584,517 | Dinkelberg | May 11, 1926 |
| 1,745,110 | Morton | Jan. 28, 1930 |
| 1,850,637 | Schiff | Mar. 22, 1932 |
| 1,938,650 | Wentz | Dec. 12, 1933 |
| 1,943,869 | Kendall | Jan. 16, 1934 |
| 2,005,442 | Spiegl | June 18, 1935 |
| 2,161,073 | Mehl | June 6, 1939 |
| 2,232,623 | Neuman | Feb. 18, 1941 |
| 2,267,234 | Garber | Dec. 23, 1941 |
| 2,319,880 | Pulleyblank | May 25, 1943 |
| 2,347,624 | Warren | Apr. 25, 1944 |
| 2,357,549 | Roberson | Sept. 5, 1944 |
| 2,378,847 | Harris | June 19, 1945 |
| 2,384,083 | Doberstein | Sept. 4, 1945 |
| 2,527,452 | Rose | Oct. 24, 1950 |
| 2,576,991 | Bainbridge et al. | Dec. 4, 1951 |
| 2,576,992 | Bainbridge et al. | Dec. 4, 1951 |
| 2,584,322 | Baldwin et al. | Feb. 5, 1952 |
| 2,584,361 | Morine | Feb. 5, 1952 |
| 2,590,965 | Huston | Apr. 1, 1952 |
| 2,656,034 | Filsinger et al. | Oct. 20, 1953 |
| 2,670,836 | Ball | Mar. 2, 1954 |
| 2,699,877 | Huston | Jan. 18, 1955 |